Dec. 22, 1970 G. J. JONES 3,550,088

CONTROL MEANS FOR TRANSISTOR SWITCHING MATRIX CIRCUITS

Filed June 25, 1968

INVENTOR

G. J. Jones

BY

Watson Cole Grindle & Watson

ATTORNEYS 3,550,088

CONTROL MEANS FOR TRANSISTOR SWITCHING MATRIX CIRCUITS

Glyn John Jones, Pinner, England, assignor to Telephone Manufacturing Company, London, England, a British company Filed June 25, 1968, Ser. No. 739,813
Claims priority, application Great Britain, July 21, 1967, 33,635/67
Int. Cl. H04q 3/64, 3/68
U.S. Cl. 340—166 2 Claims

ABSTRACT OF THE DISCLOSURE

The specification of this application discloses a form of two-wire switching device in which a complementary pair of bipolar transistors, one in each wire, are controlled by a unipolar field effect transistor connected between their bases. The switching devices are employed as controlled crosspoints of a selection matrix.

This invention relates to control means for transistor switching circuits, and to electrical static switching devices particularly suited to electrically connecting one two-wire channel to another two-wire channel.

Such means and devices are useful, for example, in communication networks where it is necessary to connect one communication channel selectively to any given one of a multiplicity of such channels, but may also be used for the control of a single channel.

It is known in the telecommunication art to use various devices for the connecting means, such as cold-cathode valves, diodes, thyristors, and transistors; the various devices being biassed or triggered to cause them to assume their conducting or non-conducting states. In the case of the conventional bipolar transistor, the emitter-collector path is used as the connecting means and a controlling bias is applied to the base electrode to cause the transistor to saturate (turn ON) or cut off (turn OFF).

The object of the present invention is to provide one improved form of such transistor connecting device.

In accordance with the invention there is provided a two-pole electrical static switching device comprising a complementary pair of bipolar transistors having their respective emitter-collector paths connected in the respective pole circuits through the device, and their base electrodes respectively connected to the source and drain electrodes of a unipolar field-effect transistor the grid of which serves to receive a control signal to operate the device between on and off conditions.

Figure 1:
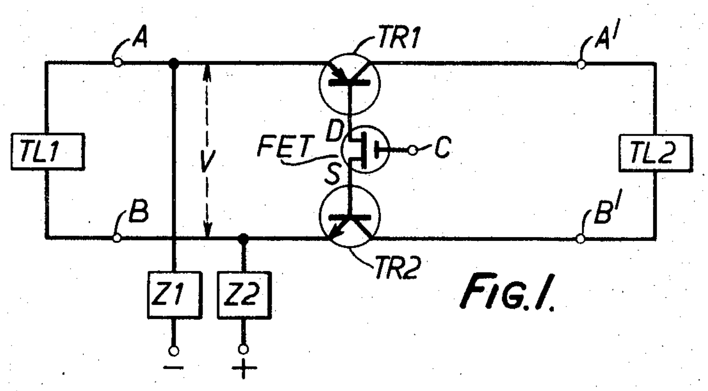
Figure 2:
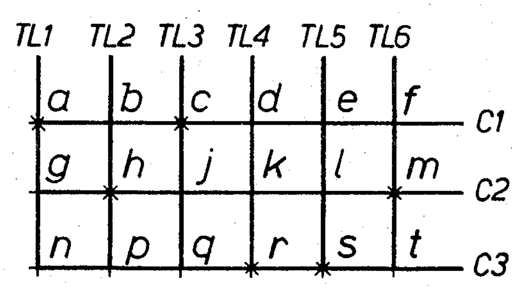
Figure 3:
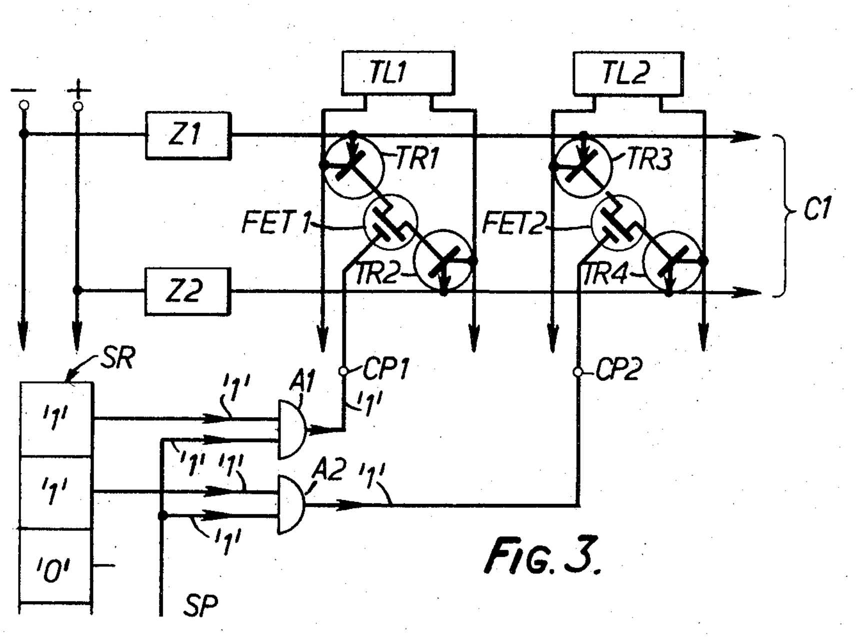

The various features and advantages of the invention will be apparent from the following description of some embodiments thereof, taken in conjunction with the drawings accompanying the provisional specification, in which FIG. 1 is a circuit of a two-pole switching device in accordance with the invention, and FIG. 2 is a representation of a crosspoint switching array, and FIG. 3 shows the circuit of part of such an array.

Referring now to FIG. 1, the two-wire connection between two telephones TL1 and TL2 is established between the terminals A–A′ and B–B′ via the emitter-collector electrodes of two bipolar transistors TR1 and TR2 respectively. The base of transistor TR1 is connected directly to the drain electrode D of field-effect transistor FET. Since transistor FET is of the unipolar type, it will carry current in either direction between the source and drain electrodes and the latter are therefore reversible. The base of transistor TR1, therefore, could equally well be connected to the source electrode and the base of transistor TR2 to the drain. The gate electrode of transistor FET is connected to control terminal C.

A potential V is established between the points A and B from power supply terminals — and + via two high impedances Z1 and Z2 respectively.

If, now, a potential higher than the threshold voltage of transistor FET is applied to terminal C and hence the gate electrode, a purely resistive path is established between the source and drain electrodes S and D in known manner. The value of the resistance is determined by the design parameters of transistor FET and the value of the potential applied to terminal C. Under this condition, therefore, the base electrodes of transistors TR1 and TR2 are connected together via the resistance of transistor FET which, in this application, is made fairly high such that only a small current flows between the two base electrodes.

Preferably, transistor FET is of the p-channel enhancement mode type, in which case a negative potential is applied to the gate electrode to cause the transistor to conduct current between its source and drain electrodes.

As shown in FIG. 1, transistors TR1 and TR2 are a complementary pair; transistor TR1 being of the PNP type and transistor TR2 being of the NPN type. Due to the potential V applied across the A and B wires, transistors TR1 and TR2 conduct, the necessary base current flowing from transistors TR1 and TR2 via the drain and source electrodes of transistor FET. A convenient value of this current is of the order of one milliamp, which is sufficient to cause transistors TR1 and TR2 to saturate; the emitter-collector voltage drop being in the order of 0.5 volt. A potential of approximately (V–1) volts now appears across terminals A and A′ and hence across the telephone TL2. Thus the two telephones are now connected in parallel across the power supply via the high impedance Z1 and Z2 and conversation may take place.

If, now, the negative potential at terminal C is replaced by a zero potential, transistor FET will cease to conduct current between its drain and source electrodes, the drain-to-source resistance becoming of the order $10^{12}$ ohms. Since no base current can now flow in transistors TR1 and TR2, these transistors cease to conduct, with the result that telephone TL2 is isolated from telephone TL1; the connection being broken at transistors TR1 and TR2.

As is well known, field-effect transistors have an inherent stray gate-to-substrate capacitance, and this capacitance is made use of in dynamic (clocked) logic systems. Due to the very high leakage resistance of field-effect transistors any charge on the gate electrode will remain for a time constant period of the order of several milliseconds. Thus, if a short negative pulse of sufficient duration to charge the gate capacitance is applied, the transistor will continue to conduct, after the pulse is removed, for the time constant period. It is therefore not necessary for a permanent potential to be applied to the gate electrode of transistor FET; periodic pulses will maintain it in the conducting state and hence transistors TR1 and TR2 remain conducting and maintain the connection. A pulse repetition frequency of 100 Hz. or higher is normally sufficient to maintain transistor FET in a stable conducting condition.

Although the example of a connection between two telephones TL1 and TL2 has been described, connection between any two loads or circuits may be established in the manner described; the two-wire channel forming part of any information-carrying circuit. The two high impedances Z1 and Z2 prevent shunting of the signals appearing on the two wires, and further shunting via transistor FET is minimised by so choosing the latter that it has a high source-to-drain resistance.

FIG. 2 is an explanatory diagram of a crosspoint array for establishing a connection between any one to any other of a given number of channels. Again, the example of a telephone connection is used, but the invention is not limited to such particular use. Referring now to FIG. 2, six telephone lines TL1–6 have access to three connectors C1–3 via crosspoint switches *a* to *t*.

To establish a connection between lines TL1 and TL3, any one of the pairs of crosspoints *a* and *c*; *g* and *j*; and *n* and *q* may be operated. Assuming crosspoints *a* and *c* are operated, thereby using connector C1 as the link between them, if it is now required to connect lines TL2 and TL6, crosspoints *h* and *m* on connector C2 may be operated. The remaining two lines, TL4 and TL5 may then be connected together via crosspoints *r* and *a* via connector C3. The operated crosspoints are represented by crosses at the respective junctions in FIG. 2.

Each of the crosspoints may be of the form described in relation to FIG. 1; the control potentials applied to the gate electrodes of the unipolar transistors being either continuous or pulsed. In the latter case, the controlling pulse potentials may be applied simultaneously to all crosspoints required to be operated or only applied to one pair of crosspoints at a time, the pulses being cycled to each pair of crosspoints in sequence, the necessary connections being decided by common equipment such as a storage or shift register.

FIG. 3 shows the circuit of the parts of FIG. 2 associated with lines TL1 and 2 and crosspoints *a* and *b*. It can be seen that each crosspoint is identical with that shown in FIG. 1. The control potentials to the gate electrodes of field-effect transistors FE1 and 2 are now applied at the respective control points CP1 and CP2. If a negative potential is applied to both of these points, telephone TL1 is connected to telephone TL2 via the emitter-collector paths of transistors TR1, 2, 3, and 4. The high impedances Z1 and Z2 feed power to both lines as described in relation to FIG. 1. As previously mentioned, the control potentials applied to points CP1 and 2 may be either continuous or pulsed. The lower portion of FIG. 3 shows means for producing synchronized pulses at points CP1 and CP2 under the control of a recirculating shift register SR and two AND gates A1, A2.

The operation of the pulse supply will now be described making use of the nomenclature used in negative logic circuitry; i.e. a negative pulse is represented by the binary digit "1" and the absence of a pulse (zero or earth potential) is represented by the binary digit "0."

Assuming that each stage of the shift register SR stores a "0" and all the crosspoints are "open" i.e. in high impedance condition, as in initial state and it is desired to "close" the two crosspoints connected for control at points CP1 and CP2. A single pair of "1" digits followed is entered into the input of the register SR and is shifted along the register until such pair occupies the uppermost pair of stages which are connected to AND gates A1 and A2. This takes up a complete circulation cycle of the register and upon completion of such cycle a synchronising pulse is applied over lead SP to both gates A1 and A2. The application of this synchronising pulse at a time when the shift register stages to which the gates A1 and A2 are connected are storing "1" digits results in "1" digits appearing at the outputs of gates A1 and A2 and these digits charge the gate capacitances of the two transistors FET1 and FET2, causing the latter to conduct and the two lines TL1, TL2 to be connected together. At the end of the synchronising pulse, the gates A1 and A2 close again but the charge on the gate capacitance causes transistors FET1 and FET2 to remain conducting during the following circulation cycle of register SR and thus until the arrival of the next synchronising pulse on the SP wire.

To "close" the two crosspoints the two "1" digits in the train of digits circulating through the registers are changed to "0" digits at the input to the register by operation of appropriate control circuits so that upon completion of the current circulation cycle a pair of "0" digits appears in the stages connected to gates A1 and A2. Thus when the synchronising pulse is applied to lead SP an "0" digit appears at the output of each of gates A1 and A2, the gate capacitances of the transistors FET1 and FET2 are discharged causing these transistors to revert to non-conductive state and "close" the crosspoints isolating lines TL1 and TL2 from each other.

It will be appreciated that in a complete switching array the register will have as many stages as there are crosspoints and the pattern of "0" digits and "1" digits in the train circulating through the register will at any time be such that upon completion of each circulation cycle and the occurrence of a synchronising pulse on the lead SP connected in common to all the AND gates there will be a "1" digits stored in each register stage corresponding to a crosspoint desired to be "opened" or maintained "open" and an "0" digit stored in each register stage corresponding to a crosspoint desired to be "closed" or maintained "closed."

As an alternative to the method of arranging the crosspoints shown in FIG. 2, where two crosspoints are involved in each connection, the telephone lines may be arranged such that three lines are associated with three verticals of the array, the other three replacing the three connectors C1 to C3. This makes a total of nine crosspoints with only one being used for each connection between two lines.

Although the invention has been described in relation to two-wire circuits or channels, it is to be understood that four-wire circuits—common in the communications art—are merely regarded as comprising two two-wire circuits and can thus be controlled by pairs of two-pole switching devices of the kind described in connection with FIG. 1 operated simultaneously.

I claim:

1. An electrical static switching device having two input terminals, two output terminals and a switching control terminal and comprising a complementary pair of bipolar transistors each having emitter, collector and base electrodes, two emitter-collector path through one of said pair of transistors being connected between a first one of said input terminals and a first one of said output terminals, the emitter collector path through the other one of said pair of transistors being connected between a second one of said input terminals and a second one of said output terminals, and a unipolar field effect transistor having source, drain and gate electrodes of which the source electrode is connected to the base electrode of one of said pair of transistors, the drain electrode is connected to the base electrode of the other of said pair of transistors and the grid electrode is connected to said switching control terminal.

2. A co-ordinate switching array comprising a plurality of pairs of row conductors and a plurality of pairs of column conductors, and a plurality of electrical static switching devices in accordance with claim 1 each having the two input terminals thereof respectively connected to a pair of row conductors and each having the two output terminals thereof respectively connected to a pair of column conductors whereby each said pair of row conductor is connectable to any one of said pairs of column conductors by the operation of an appropriate one of said switching devices.

References Cited

UNITED STATES PATENTS 3,343,129 9/1967 Schmitz ------------ 340—166

HAROLD PITTS, Primary Examiner

U.S. Cl. X.R.

307—139; 340—167, 172